United States Patent [19]

Hurst

[11] 4,134,128
[45] Jan. 9, 1979

[54] TELEVISION PICTURE SIZE ALTERING APPARATUS

[75] Inventor: Robert N. Hurst, Cherry Hill, N.J.

[73] Assignee: RCA Corporation, New York, N.Y.

[21] Appl. No.: 754,688

[22] Filed: Dec. 27, 1976

[30] Foreign Application Priority Data

Mar. 19, 1976 [GB] United Kingdom ............... 11111/76

[51] Int. Cl.$^2$ ......................... H04N 5/22; H04N 5/14
[52] U.S. Cl. ..................................... 358/22; 358/160
[58] Field of Search ................... 358/12, 22, 138, 160, 358/180, 13

[56] References Cited

U.S. PATENT DOCUMENTS

| | | | |
|---|---|---|---|
| 3,571,494 | 3/1971 | Law ................................... | 358/138 X |
| 3,683,111 | 8/1972 | Southworth ......................... | 358/138 |
| 3,946,432 | 3/1976 | Goldberg et al. ..................... | 358/13 |
| 4,063,280 | 12/1977 | Hattori et al. ....................... | 358/22 |

Primary Examiner—Robert L. Griffin
Assistant Examiner—Aristotelis M. Psitos
Attorney, Agent, or Firm—Eugene M. Whitacre; Paul J. Rasmussen; Robert L. Troike

[57] ABSTRACT

The size of a color television picture field is changed without changing the size of the raster. This is achieved in an apparatus that includes means responsive to a field of television video signals for sampling same and providing a predetermined number of samples of television video signals per line and a predetermined number of lines per field and means responsive to the predetermined number of samples per line and lines per field for providing a full field of television video signals. Size reduction is accomplished by causing the first mentioned means to skip samples provided at the output thereof in groups of N, where N is the number of samples in a color subcarrier cycle, and to skip line pairs of the field.

11 Claims, 4 Drawing Figures

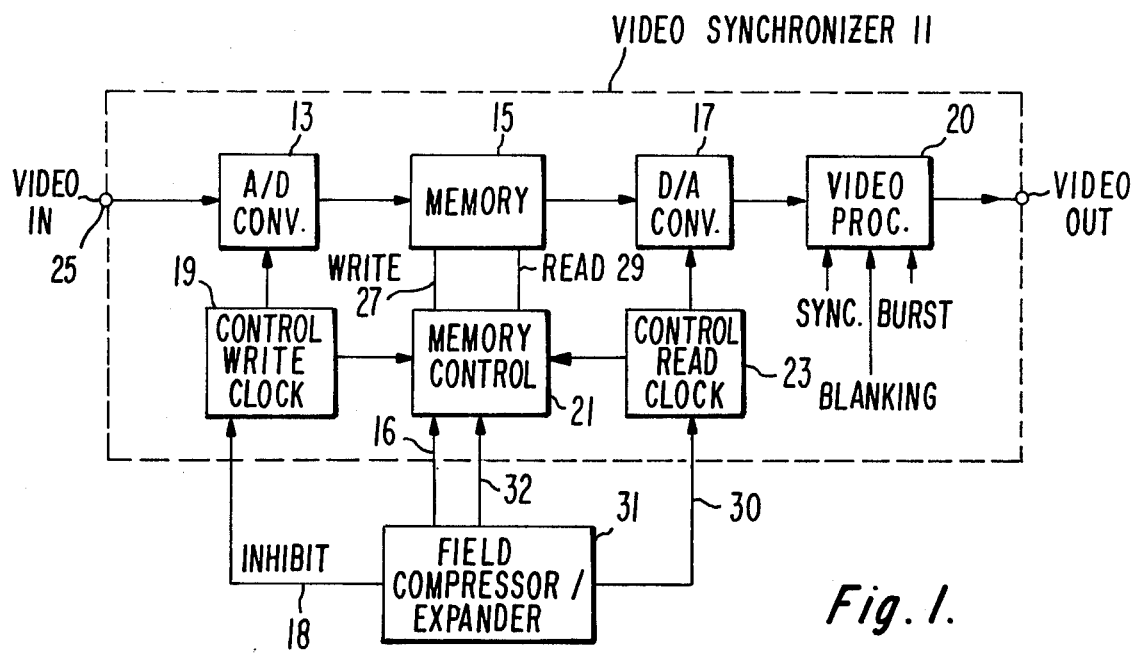
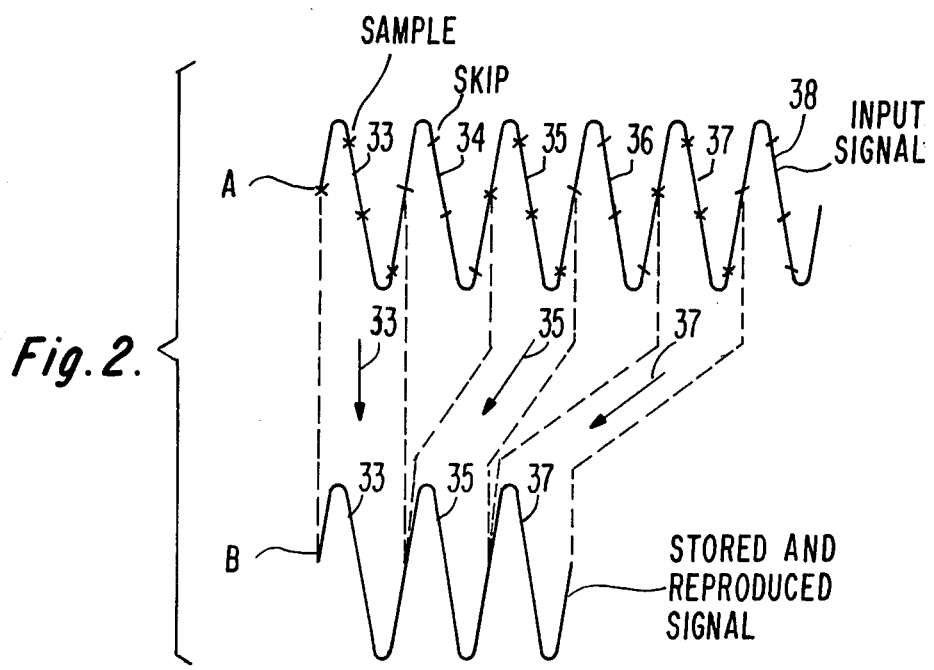
Fig. 1.
Fig. 2.

TELEVISION PICTURE SIZE ALTERING APPARATUS

BACKGROUND OF THE INVENTION

This invention relates to apparatus for altering the size of a television picture and, more particularly, to an apparatus which includes means for sampling incoming video signals and providing second television video signals constructed from samples of the incoming television video signals.

Recently, video synchronizers have been introduced. These synchronizers have been introduced in order to synchronize broadcast sources to the local station reference generator. A video synchronizer is an electronic unit that samples the analog input, converts it to a digital format, stores the digital data, and operates on the digital data to deliver a desired analog output which is constructed from the sampled video. It is designed to automatically lock a non-synchronous broadcast signal to a reference generator and thus allow fully synchronous treatment of the incoming video for mixing with station programs. The non-synchronous signal is digitized and stored in a memory. The data is clocked out of the memory at a rate locked to the reference sync generator (usually the local station). This synchronizer isolates the input and output video lines and the output is fully synchronous in vertical, horizontal and color phases with the reference.

These video synchronizers make possible many special effects for relatively low additional cost. Applicant's invention herein relates to the special effect of expansion or compression using apparatus like these video synchronizers by adding or eliminating samples. Applicant has found, however, that picture compression or expansion by indiscriminately adding or eliminating samples or lines is unworkable for reproducing color since such adding or eliminating disrupts the subcarrier, and randomly adding or eliminating lines disrupts the normal color sequency required for sequential lines in the NTSC television system.

SUMMARY OF THE INVENTION

An apparatus for altering the size of a television picture without changing the size of the raster is provided. This apparatus includes means responsive to a field of television signals for sampling same and providing a predetermined number of samples of a television video signal per line and a predetermined number of lines per field, and means responsive to the predetermined number of samples per line and lines per field for providing a full field of television video signals. The size of the television picture is changed by means coupled to the first means for causing the first means to alter the number of samples provided at the output thereof.

BRIEF DESCRIPTION OF THE DRAWINGS

FIG. 1 is a system block diagram of an embodiment of the present invention.

FIG. 2 presents waveforms useful in illustrating the skipping of whole cycles to produce picture compression without color loss.

DESCRIPTION OF THE INVENTION

Figure 3:
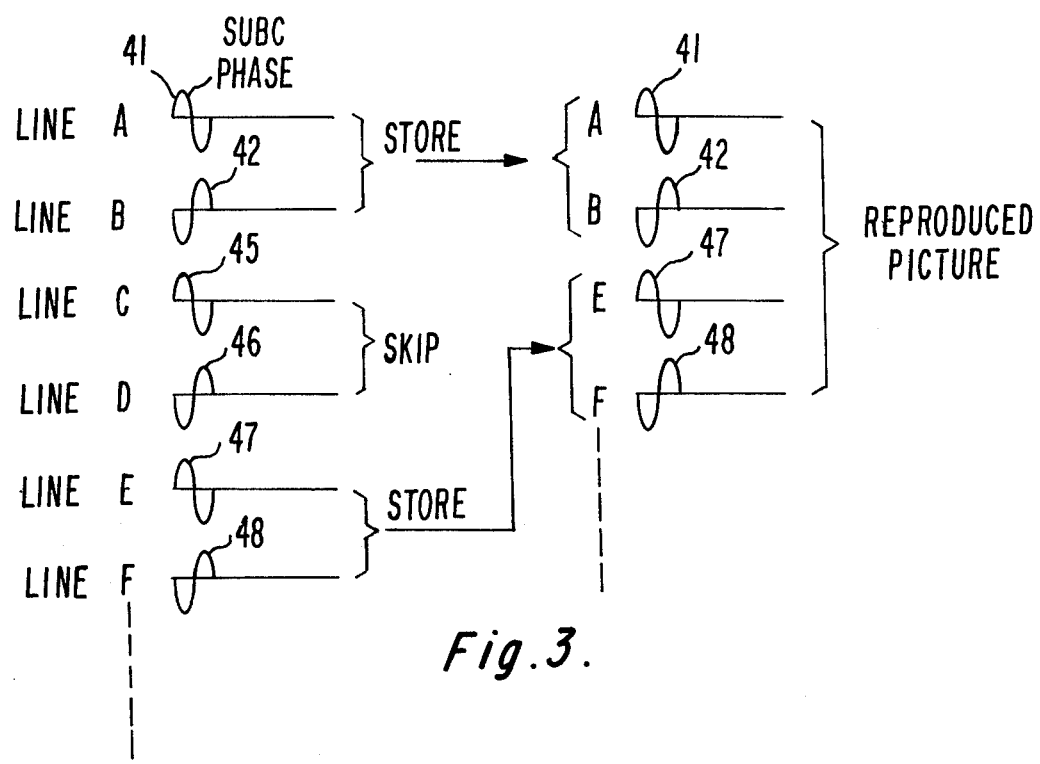
FIG. 3 presents waveforms useful in illustrating the skipping of alternate line pairs of a field to produce vertical picture compression without color loss.

Referring to FIG. 1, there is illustrated a system for altering the size of a television picture using, for example, a video synchronizer 11. This synchronizer may be for example RCA type TFS-121 video synchronizer sold by RCA Broadcast Systems, Camden, N.J. The video synchronizer 11 includes an A to D (analog to digital) converter 13, a memory 15, a D to A (digital to analog) converter 17, a controllable write clock generator 19, a memory control 21 and a controllable read clock generator 23. The picture video is applied at terminal 25 and is coupled to an A to D converter 13. The controllable write clock generator 19 generates strobing or sampling pulses to the A to D converter 13 for example at a 14.3 MHz rate. In a typical system, 768 samples of the video are taken on each horizontal line of the television picture. Based on the relative amplitude of these signals a digital code for each sample is stored in the memory 15. This code may be for example an 8-bit digital code. The video is sampled four times the subcarrier cycle (3.57 MHz) in order to store and faithfully reproduce the color subcarrier signal. At the same time, these clock pulses from the write clock generator 19 cause the memory control 21 to provide a write address in the memory via multiple leads 27 for each sample. In addition, memory control 21 senses the end of a line (for example by counting 768 samples from clock 19) and provides that address to the memory 15. The video is read out of the memory 15 by applying clock pulses from controllable read clock generator 23 to the D to A converter 17 and memory control 21. The read clock pulses applied to the memory control 21 cause the memory control 21 to supply appropriate read addresses via multiple leads 29 to the memory 15. Upon receipt of the clock pulses applied to the D to A converter 17, video appears at the output thereof that corresponds to the 8-bit coded video at the input. In the typical synchronizer system 11, the video out of the D to A converter 17 is applied to video processor 20 where locally generated sync, burst and blanking are applied. In the system described herein, field compression or expansion is provided by field compressor/expander 31 coupled, for example, to the memory control 21, to write clock generator 19 and to read clock generator 23.

Field compression is achieved, for example, by sending inhibit signals from compressor/expander 31 to the controllable write clock generator 19 via lead 18 inhibiting pulses therefrom and causing some of the video not to be converted to digital form and applied to the memory 15. At the same time inhibit pulses are sent from compressor/expander 31 via lead 16 to the memory control 21 for causing the omitting of the addressing during the sample skipping periods. This reduces the number of samples and hence the amount of video stored in the memory 15. For example, assume that every other sample of the digitized picture was eliminated by failure to send a clock pulse from write clock generator 19. When the read clock generator 23 addresses the memory control 21 at the normal rate, the picture width would come out in half the time and there would be a left-to-right compression of 2 to 1. Similarly, an inhibiting signal from the field compressor/expander 31 may be applied for example to memory control 21 via lead 16 to cause the memory control 21 to provide addresses for only every other line. At the same time an inhibiting signal may be applied from compressor/expander 31 to the controllable write clock generator 19 via lead 18 to cause the write clock generator 19 to apply strobing pulses to the A to D converter 13 only during every other line and thereby to cease writing every other line of the field into the memory. When the read clock generator 23 applies signals at the normal rate, the resulting output picture is vertically compressed 2 to 1.

In accordance with the system described in FIG. 1, the compression or expansion can be achieved by writing into the memory at the normal rate but by controlling the controllable read clock generator 23 via lead 30 so as to skip samples in the memory (compression) or to repeat samples in the memory (expansion). For example, field compression is achieved by providing an inhibit signal via lead 32 to cause the memory control 21 to skip addresses in the memory. Field expansion can be provided for example by providing a second signal from the field compressor/expander 31 to be applied to memory control 21 via lead 32 to cause the memory control 21 to repeat addresses and thereby repeat the scanning of portions of the memory 15 by providing repeated samples and lines to be converted to video.

The approach to picture compression by eliminating or skipping every other sample of a digitized picture or the suppressing of the writing into the memory of every other line is a problem if the video transmitted includes color information. This approach would cut the sample rate in half and hence render the system incapable of reliably reproducing the color subcarrier. Even if this difficulty was circumvented, it is not possible to achieve vertical compression by omitting alternate lines since the phase of the color subcarrier alternates on each successive line of the field. The phase of color burst and chroma on each successive line of a field is 180° out of phase with respect to color burst and chroma of the preceding line. For example, the phase of the color burst and chroma of the second line of a field is 180° out of phase with the color burst and chroma of the first line of that field. If every other line were omitted, this subcarrier on the remaining lines would be of identical phase line-to-line and hence the reproduced picture would be devoid of color.

These problems are solved herein by eliminating or repeating the number of samples per line in groups of N, where N is the number of samples per subcarrier cycle of a color television signal, and by changing the height of the picture by eliminating or repeating adjacent pairs of lines in a given field. For example, in the arrangement shown in FIG. 1 where it is desired to reduce the width of the picture by 2 to 1, the write clock sampling rate would be reduced 2 to 1 by skipping every other cycle of the color subcarrier. In the system described above, there are for example 768 samples per line and the number of samples per cycle of the subcarrier frequency is four. Samples in this case are skipped in groups of four. To reduce the width by 2 to 1, four sampling pulses would be provided by the write clock generator 19 at the normal rate with the next four sampling pulses inhibited to thereby write a full color subcarrier cycle into the memory and then skip a whole cycle. The result is that the color is preserved but the picture is horizontally compressed 2 to 1 as shown in FIG. 2. Waveform A of FIG. 2 shows six whole cycles of the color subcarrier signal (cycles 33 through 38 — 24 samples). Waveform B of FIG. 2 shows the skipping of whole cycles of the color subcarrier (cycles 34 and 36 — 8 samples) to produce color compression without color loss. The "×" and "—" on waveform A indicate the normal sampling points. The "—" indicates the samples skipped to compress. Note that four samples are skipped when each cycle is skipped.

In the system where the vertical height is also to be reduced 2 to 1, the skipping of the lines is modified to write in a field in the sequence store — store, skip — skip, store — store. Since half of the vertical elements are omitted, the picture is vertically compressed 2 to 1. The skip configuration as chosen is the key to vertical compression. Since adjacent pairs of lines show the proper color phase alternation, the lines are written in pairs and skipped in pairs, thus preserving the vital line-to-line color phase alternation as shown in FIG. 3. Waveforms 41 and 42 on picture field lines A and B illustrate the phase of the subcarrier wave on the adjacent lines of a field. Similarly, waveforms 45, 46, 47 and 48 illustrate the phase of the subcarrier at the beginning of lines C, D, E, and F, respectively, of the field. As noted by the store — store, skip — skip method, lines C and D are removed and since the subcarrier on line E is 180° out of phase with the subcarrier of line B, a reproduced picture is provided in which the proper phase alternation is maintained.

The above techniques are extendable to picture expansion by repeating groups of cycles and pairs of lines in a field wherein the grouping within a line is done in terms of N samples, where N is equal to the number of samples in a subcarrier cycle and the lines are repeated in adjacent pairs. For example, where it is desirable to expand 2 to 1, the four samples or full subcarrier cycle would be read from the memory and then repeated from the memory before going to a new group of four samples. Also, in this arrangement to expand the vertical height by 2 to 1, the lines would be repeated in pairs. This field expansion in the arrangement of FIG. 1 would be controlled by a signal from the compression/expander 31 via lead 32 which causes the memory control 21 to repeat sample and line addresses to repeat samples in groups of four and to repeat lines of a field in pairs.

In the typical system described above, where there are 768 samples per active video line, dropping four samples or one cycle of subcarrier at some time during the active-line write-in reduces the readout picture to 764/768 ths of its normal horizontal size. Further, by causing the apparatus to provide evenly distributed drops of four samples will cause horizontal compression as the groups of samples dropped are slowly increased in number. Conversely, a single repeat of four samples (on the read side) will increase the picture width to 772/768 ths of its normal size; more repeats smoothly increasing in number will smoothly expand the picture horizontally. All of these repeats or dropping of samples are to be done on a subcarrier-cycle basis so as to reproduce the subcarrier cycle. Similarly, the height of the picture can be changed by adding or subtracting pairs of lines as described above to thereby afford a variable size change in the vertical direction. Taken together, these two mechanisms will provide zoom, compression or aspect ratio modification.

Figure 4:
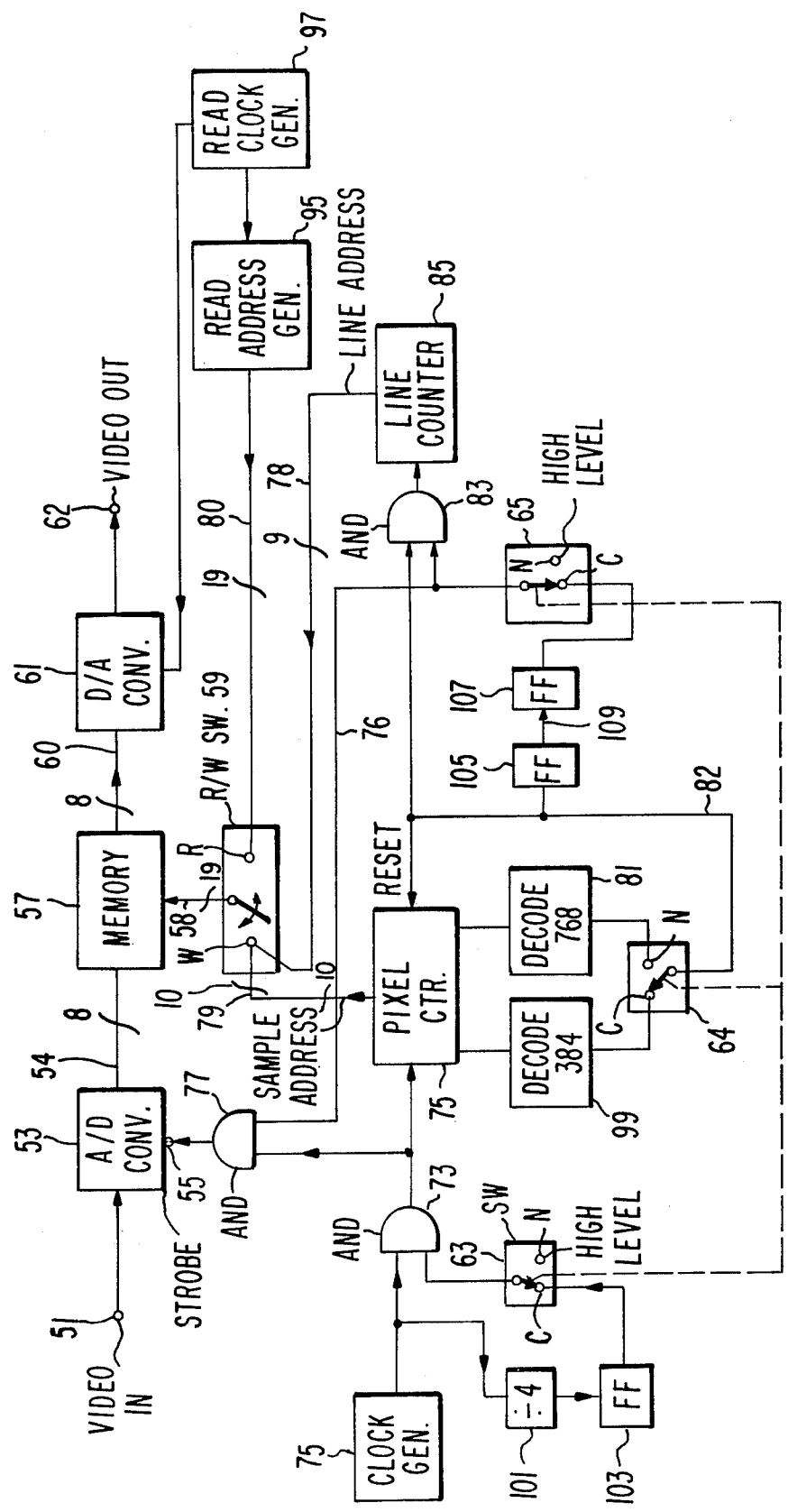
FIG. 4 is a block diagram of a system for reducing both the width and the height of a television picture field by 2 to 1.

Referring to FIG. 4, a system is illustrated for compression of the width and height by a ratio of 2 to 1. The video input signals to be compressed are applied to input terminal 51 of for example a video synchronizer, such as RCA TFS-121 Video Synchronizer. The video signals at terminal 51 are applied to an A to D (analog to digital) converter 53. The A to D converter is strobed by clock pulses applied to terminal 55 and the sampled analog video signal is converted to for example an 8-bit parallel digital code. Each 8-bit word is coupled via an 8-wire lead 54 to the memory 57 where it is placed in location according to an address provided via read/write switch 59 when it is in the write or store position "W." When read/write switch 59 is in the read or "R" position, with the same address from the read address generator 95, the same 8-bit word is transferred out to the D to A (digital to analog) converter 61 via 8-wire lead 60 where it is converted from the digital code back to analog and applied to the video output 62.

Whether or not the apparatus compresses is determined by the position of ganged switches 63, 64 and 65. When these switches are in the "C" position, the apparatus is compressing and when it is in the "N" position it is normal. All of the switches 63, 64 and 65 are ganged together and they are shown in FIG. 4 in the compressed or "C" position. Consider, first, however what happens in the "N" or normal position. In the normal position, 768 clock pulses from a clock generator 71 are provided to encode the active portion of each television line. If the blanking interval is also encoded, 910 pulses are required per line. These clock pulses (at 14.3 MHz rate) are applied to AND gate 73. When switch 63 is in the "N" position, a constant high level signal is provided to AND gate 73 enabling the pulses from clock generator 71 to be applied to the picture-element (PIXEL) counter 75 and to AND gate 77 which is coupled to the strobe terminal 55 of A to D converter 53. When switch 65 is in the "N" position, an enabling signal level (high) is provided via lead 76 to AND gate 77 causing each of the clock pulses provided from AND gate 73 to be applied as strobe pulses to the A to D converter 53. The picture-element counter 75 is a digital counter capable of counting to 768. This counter may be for example a 10-bit digital counter. This counter provides via 10-wire lead 79 a 10-bit code word which is the address for the video sampled at that instant to the "W" or write terminal of read/write switch 59. A decoder 81 is coupled to the counter 75 and provides an output to terminal "N" of switch 64. This decoder 81 senses the reception of 768 pulses to counter 75. Since there are 768 samples per active picture line, this decoder 81 senses the termination of an active picture line. With the switch 64 in the "N" position, the decoder 81 provides a reset pulse to the picture element counter 75 and also provides a signal to AND gate 83 via bus 82. As stated previously, when the switch 65 is in the "N" position, a high enabling level is provided to AND gate 83 enabling the pulse from decoder 81 to be applied via lead 82 to line counter 85. Line counter 85 provides a line address to the "W" or write input terminal of read/write switch 59 via lead 78. This counter 85 may be for example a 9-bit counter and lead 78 may be a 9-wire lead to provide the necessary number of bits to identify each line. There is also a multi-wire (19-wire) lead 58 between read/write switch 59 and memory 57. The video is read at the normal rate when switch 59 is in the "R" or read position and read address signals from read address generator 95 are applied via lead 80 (19 wires) to "R" terminal of read/write switch 59 and read clock pulses are applied to the digital to analog converter 61 from generator 97. The read address generator 95 addresses the memory 57 with for example a 19-bit code which code in the normal state for the same sample in the same line is identical with that placed by the picture-element counter 75 and the line counter 85 to pick up the same 8-bit digital data at that location. Read/write switch 59 electronically switches automatically between read ("R") and write ("W") positions in a manner such that reading and writing does not occur at the same location at the same time with reading occurring only after writing. When the switch 59 is in the read position, the 8-bit code is read out of the memory 57 to the D to A converter 61 via 8-wire lead 60. The 8-bit code is converted back to analog in response to the strobe pulse at the converter 61 provided by generator 97. The read clock generator for normal reading is set at 14.3 MHz.

When switches 63, 64 and 65 are thrown into the "C" or compressed position, the constant high enabling signal levels presented from switches 63 and 65 are removed and the decoder 81 is disconnected. A decoder 99 is connected between picture-element counter 75 and terminal "C" of switch 64. This decoder 99 detects the sampling of 384 clock pulses received at counter 75 from the generator 71. Coupled between the output of generator 71 and the "C" terminal of switch 63 is a divide-by-four circuit 101 and a flip-flop circuit 103. Every four pulses received from the clock generator 71 causes the flip-flop 103 to change state. If flip-flop 103 is initially in a high enabling level output state, a high enabling level is applied to terminal "C" of switch 63 for the first four clock pulses and a "low" level (inhibit level) to terminal "C" for the next four clock pulses. The first four clock pulses are thereby enabled to pass through AND gate 73 to the picture-element counter 75 and AND gate 77. When the second group of four pulses occurs, however, a low inhibit level is present at terminal "C" of switch 63 and at AND gate 73 which causes these clock pulses to be inhibited from being applied thru AND gate 73 to the picture-element counter 75 and AND gate 77. After the second set of four pulses, a high enabling level is again presented at the "C" terminal of switch 63 and these clock pulses are again enabled to pass through AND gate 73. Since during the second set of four clock pulses, there are no pulses applied to AND gate 77, there are no strobe pulses to terminal 55 of A to D converter 53. The video will be cut off during the absence of the clock pulses since the A to D converter 53 will not convert the second four video samples. Consequently, this second set of four video samples will not be applied to the memory 57. Similarly during this blanking period, there will be no changes of addresses from the picture-element counter 75 since no pulses will be received from the AND gate 73. When the picture-element counter 75 has counted to 384 pulses, the decoder 99 will apply a high enabling level to terminal "C" of switch 64. This will provide a high or reset pulse via lead bus 82 to the counter 75 and a high enabling signal to AND gate 83. Since the number of picture elements encoded during a horizontal line has been cut in half, a horizontal line has beem completed on the reception of 384 pulses applied to the picture-element counter 75.

Vertical compression is provided by the circuit comprising flip-flops 105 and 107. Flip-flop 105 respond to each high level signal on the load bus 82 by changing state. Each time a high level signal is provided at output of flip-flop 105, this high is applied via lead 109 to flip-flop 107 causing it to change state. Consequently, the output of flip-flop 107 changes states on the receipt of every other pulse applied from the load bus 82. Therefore, the output from flip-flop 107 remains high with the first two pulses applied on the load bus 82 and then provides a low for the next two pulses on the load bus 82. Therefore, a high enabling level is provided for the first two lines and a low or inhibiting level is provided for the second two lines to "C" terminal of switch 65. Terminal "C" of switch 65 is coupled to both AND gates 83 and 77 via lead 76. At AND gate 83, the line rate clock pulses from the bus 82 are enabled for the first two lines but are interrupted for every other pair of lines. At the same time, a high is provided on lead 76 so that gate 77 is also enabled for the first two lines and interrupted for the next two lines to cut off the strobe pulses to the A to D converter 53 for two successive lines. Consequently, in the above system, the memory 57 will record four successive samples and it will skip four successive samples and will do this for an entire line. It will also write two successive lines and skip two successive lines. When the normal read addresses from address 95 are fed to the read/write switch 59 via lead 80, the memory will produce at its output a compressed picture in which only one-quarter of its total area is utilized. However, the apparatus shown has preserved the proper subcarrier relationship on a left — right and a line — line basis so that a normal NTSC subcarrier sequence is read out of the memory.

The above described techniques for compression or expansion may be used in the SECAM and PAL systems with some modifications to accommodate their specific requirements. In the SECAM system, the two color difference signals are transmitted alternately on successive lines of a field. Therefore, the vertical compression arrangement taught above for the NTSC system applies directly to the SECAM system, since preserving and dropping lines in successive pairs preserves the alternate line color difference arrangement of SECAM. In the PAL system, the width compression method taught above (full cycle skip) may be applied directly. The grouping of lines for omission or retention must be done in a manner which recognizes the phasing of the lines in the PAL system.

What is claimed is:

1. Apparatus for altering the size of a television picture without changing the size of the raster, comprising:
   means including an analog to digital converter responsive to incoming television video signals for sampling same and providing a predetermined number of digital data signals for each television line representing a predetermined number of samples of the television video signal per line and a predetermined number of lines per field,
   means including a digital memory responsive to said data signals for storing same,
   means including a digital to analog converter coupled to said second-mentioned means for reading out and converting said digital data signals whereby said predetermined number of samples per line and lines per field provide a full field of sampled television video signals, and
   means coupled to said first-mentioned means and said second-mentioned means for altering the number of data signals per line stored in the digital memory to thereby change the width of the television picture.

2. The combination of claim 1, including means coupled to said first-mentioned means and second-mentioned means for altering, the number of lines per field stored in the digital memory to thereby change the vertical height of the television picture.

3. The combination of claim 1, wherein said means for altering the number of data signals per line includes means for causing said first-mentioned means to skip data signals provided at the output thereof in groups of N, where N is the number of samples in a color subcarrier cycle.

4. The combination of claim 3, wherein N is four.

5. The combination of claim 1, wherein said first-mentioned means includes a write clock pulse generator wherein said analog to digital converter is responsive to strobing pulses from said generator for converting samples of said incoming video to digital data signals.

6. The combination of claim 5, wherein said means for altering the number of data signals per line includes means for interrupting the pulses provided by the write clock generator by causing the write clock generator to skip clock pulses provided at the output thereof in groups of N, where N is the number of samples in a color subcarrier cycle.

7. The combination of claim 6, including means coupled to said first-mentioned means for inhibiting pulses from the write clock generator for line pairs of the field to thereby change the vertical height of the television picture.

8. Apparatus for altering the size of a television picture without changing the size of the raster, comprising:
   means responsive to incoming television video signals for sampling same and providing a predetermined number of samples of the television video signal per line and a predetermined number of lines per field,
   means responsive to said predetermined number of samples per line and lines per field for providing a full field of sampled television video signals,
   means coupled to said first-mentioned means for altering the number of samples per line provided at the output thereof to thereby change the width of the television picture, and
   means coupled to said first-mentioned means for causing said first-mentioned means to skip line pairs of the field to reduce the vertical height of the television picture.

9. The combination of claim 8 where N is 4.

10. The combination of claim 8 including means coupled to said first-mentioned means for causing said first-mentioned means to repeat line pairs of the field to increase the vertical height of the television picture.

11. Apparatus for altering the size of a television picture without changing the size of the raster, comprising:
   means responsive to incoming television video signals for sampling same and providing a predetermined number of samples of the television video signal per line and a predetermined number of lines per field,
   means responsive to said predetermined number of samples per line and lines per field for providing a full field of sampled television video signals, and
   means coupled to said first-mentioned means for altering the number of samples per line provided at the output thereof to thereby change the width of the television picture,
   said means for altering the number of samples per line includes means for causing the first-mentioned means to repeat samples provided at the output of said first-mentioned means in groups of N, where N is the number of samples in a color subcarrier cycle.

* * * * *